(12) United States Patent
Kumar et al.

(10) Patent No.: US 7,410,537 B2
(45) Date of Patent: Aug. 12, 2008

(54) PROCESS FOR THE PRODUCTION OF PORTLAND SLAG CEMENT USING GRANULATED BLAST FURNACE SLAG

(75) Inventors: Rakesh Kumar, Jamshedpur (IN); Sanjay Kumar, Jamshedpur (IN); Amitava Bandopadhaya, Jamshedpur (IN); Surya Pratap Mehrotra, Jamshedpur (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 11/491,916

(22) Filed: Jul. 25, 2006

(65) Prior Publication Data
US 2008/0022903 A1 Jan. 31, 2008

(51) Int. Cl.
*C04B 7/04* (2006.01)

(52) U.S. Cl. .................. 106/714; 106/715; 106/739; 106/765

(58) Field of Classification Search ............. 106/714, 106/715, 739, 765
See application file for complete search history.

(56) References Cited

U.S. PATENT DOCUMENTS

| | | | | |
|---|---|---|---|---|
| 4,047,961 A | * | 9/1977 | Alderete et al. | 106/715 |
| 5,393,342 A | * | 2/1995 | Hooykaas | 106/714 |
| 6,709,509 B2 | * | 3/2004 | Taylor-Smith et al. | 106/745 |
| 6,776,839 B2 | * | 8/2004 | Ko | 106/790 |

FOREIGN PATENT DOCUMENTS

| | | | |
|---|---|---|---|
| EP | 434112 A1 | * | 6/1991 |
| JP | 3-115144 A | * | 5/1991 |
| JP | 4-89335 A | * | 3/1992 |
| JP | 6-33057 A | * | 2/1994 |
| JP | 9-110510 A | * | 4/1997 |
| JP | 9-255378 A | * | 9/1997 |
| JP | 11-61125 A | * | 3/1999 |
| JP | 11-92206 A | * | 4/1999 |
| JP | 2001-233645 A | * | 8/2001 |
| JP | 2002-87854 A | * | 3/2002 |
| RU | 2087439 C1 | * | 8/1997 |
| SU | 1616868 A1 | * | 12/1990 |
| SU | 1691335 A1 | * | 11/1991 |

OTHER PUBLICATIONS

Derwent-Acc-No. 1999-190938, abstract of Chinese Patent Specification No. 1063160C (Mar. 2001).*
Derwent-Acc-No. 2001-614643, abstract of Korean Patent Specification No. 2001038096A (May 2001).*
Derwent-Acc-No. 2005-787774, abstract of Chinese Patent Specification No. 1640843A (Jul. 2005).*

* cited by examiner

*Primary Examiner*—Anthony J. Green
(74) *Attorney, Agent, or Firm*—Sughrue Mion, PLLC

(57) ABSTRACT

Accordingly, the present invention provides an improved process for the production of Portland slag cement using granulated blast furnace slag, which comprises:
   (viii) forming of cement clinker by known process,
   (ix) ball-milling of cement clinker for a period ranging between 30-60 minutes in dry condition,
   (x) reducing size of granulated blast furnace slag by any process to obtain the size in the range between 210 to 100 μm for using as feed for attrition mill,
   (xi) wet milling of granulated blast furnace slag for a period ranging between 5-15 minutes in an attrition mill using granulated blast furnace slag to water ratio in the range of 1:1 to 1:2 and granulated blast furnace slag to grinding bail ratio in the range of 1:5 to 1:15,
   (xii) removing water from the slurry obtained after attrition milling by known process,
   (xiii) drying of the obtained slurry by known process,
   (xiv) mixing intimately of:
      attrition milled slag obtain in step (vi) in the range of: 50 to 95% by weight
      ball-milled clinker obtain in step (ii) in the range of: 05 to 45% by weight
      gypsum in the range of: 01 to 05% by weight for a period in the range of 15 to 30 minutes.

4 Claims, No Drawings

PROCESS FOR THE PRODUCTION OF PORTLAND SLAG CEMENT USING GRANULATED BLAST FURNACE SLAG

BACKGROUND OF THE INVENTION

The present invention relates to an improved process for the production of Portland slag cement using granulated blast furnace slag. The invention particularly relates to a process for the production of Portland slag cement using cement clinker and higher proportion of ground granulated blast furnace slag, which is a waste material from steel plants.

The products produced by the process of present invention may be of different particle sizes and shapes, different specific surface areas and with different reactivity. The Portland slag cement of the present invention shall be useful in buildings and other large structure such as dams, bridges, roads, etc. The hitherto known processes to produce Portland slag cement use cement clinker, granulated blast furnace slag and gypsum to produce blended slag cement. The existing possesses use cement clinker in the range of 55-90% by weight, granulated blast furnace slag in the range of 5-40% by weight and gypsum in the range of 1 to 5% by weight. The existing process to produce cement clinker which is the main raw material for Portland slag cement consisted of crushing of raw materials such as limestone, clay, quartz, quartzite etc in a jaw crusher, fine grinding of the crushed raw material in a ball mill or vertical roller mill, proportioning of raw materials, blending in the silos and firing in the coal fired rotary kiln.

The existing processes (N. Patzelt, Finish grinding of slag, World Cem. Vol 10, 1993, 51-8) to produce Portland slag cement consisted of inter-grinding of cement clinker, granulated blast furnace slag and gypsum for 30 to 60 minutes in a mill. Air is circulated in the mills for homogeneous grinding. The product obtained after grinding is Portland slag cement.

Another known process (L. Opoczky, Grinding technical questions of producing composite cements, Int. J. Miner. Process 1994, 44-45) uses grinding of cement clinker and granulated blast furnace slag separately in a mill. Mixing of separately milled constituents along with gypsum powder gives the Portland slag cement.

The hitherto known process have the following limitations:
a. The main raw material for the Portland slag cement is the cement clinker (55 to 85% by weight). Granulated blast furnace slag can be used only in the range of 15 to 40% by weight. The formation of cement clinker is an energy intensive process due to crushing, grinding and high temperature firing. Production of 1 ton of clinker consumes ~3200 MJ energy.
b. The formation of cement clinker includes high temperature firing and uses limestone ($CaCO_3$) resulting into huge emission of $CO_2$. Production of 1 ton of clinker emits ~1 ton $CO_2$.
c. The production cost of Portland slag cement is relatively high as it uses more cement clinker.
d. The early strength development is low due to poor reactivity of granulated blast furnace slag.

Traditionally, Portland slag cement has been produced by inter-grinding cement clinker with granulated blast furnace slag in grinding mills (N. Patzelt, Finish grinding of slag, World Cem. Vol 10, 1993, 51-8). The traditional method and apparatus for using blast-furnace slag cement clinker production was patented in India in 1995 (2180/DEL/95). Reference may be made, to ACI Committee 233, Ground Granulated blast-furnace slag as a cementitious constituent in concrete, ACI Mater J 1995;92(3): 321-2, wherein the Portland slag cement produced by existing processes have lower early strength and longer setting time than the ordinary Portland cement and this restricts the use of large proportion of slag in blended cement. Yet another reference may be made to, Li Dongxu, Wu Xuequan, Shen Jinlin, Wang Yujiang, 'The influence of compound admixtures on the properties of high-content slag cement', Cem Concr Res, Vol 30, 2000, 45-50, and F. T. Olorunsogo, 'Particle size distribution of GGBS and bleeding characteristics of slag cement mortars', Cem Concr Res, Vol 28 (6), 1998, 907-19, wherein uses of large volume of slag in blended cements have attracted intensive research attention. Fine grinding and mechanical activation of slag is suggested to improve the reactivity of the blended cement constituents, namely the clinker and the slag (A. Z. Juhasz, L. Opoczky, Mechanical activation of Minerals by Grinding: Pulverizing and Morphology of Particles, Ellis Horwood Limited, N.Y., 1994,). Due to increased fineness, the controlled particle size distribution (CPSD) compensates for the relatively low hydraulic activity of granulated blast furnace slag. Various types of milling devices have been tried for the fine grinding and mechanical activation of cement constituents. Reference may be made to M. Oner, K. Erdogdu and A. Gunlu, 'Effect of components fineness on strength of blast furnace slag cement', Cem Concr Res, Vol 33, 2003, 463-9, wherein a comparative study of grinding and mechanical activation of blended slag cements in a ball mill, vibro-mill with balls and vibro-mill with rings have indicated that vibro-mill with balls required the shortest activation time. According to literature and patent survey and available information, it may be mentioned that at present no process is available to produce Portland slag cement using attrition milling. The purpose of this development is to use abundantly available waste materials such as granulated blast furnace slag, which is causing environmental pollution, as major constituent to produce value added product such as Portland slag cement.

The main object of the present investigation is to provide an improved process for the production of Portland slag cement using granulated blast furnace slag, which obviates the drawbacks as detailed above.

Another object of the present invention is to provide an improved process to produce Portland slag cement using higher proportion (50 to 95% by weight) of industrial waste such as granulated blast furnace slag in place of cement clinker whereby the energy consumption is significantly reduced.

Yet another object of the present invention is to provide an improved process to produce Portland slag cement whereby the $CO_2$ emission is significantly reduced.

Yet another object of the present invention is to provide an improved process to produce Portland slag cement whereby the cost of production is appreciably lowered and the properties of the product is improved.

Still another object of the present invention is to provide an improved process to produce Portland slag cement whereby the reactivity of granulated blast furnace slag is increased by mechanical activation and the early strength development of the product is improved.

The granulated blast furnace slag used in the present invention contains calcium oxide (CaO), silica ($SiO_2$), alumina ($Al_2O_3$) and magnesium oxide (MgO) and mostly amorphous in nature. The cement clinker used in present invention contains $C_3S$, $C_2S$, $C_3A$ and $C_4AF$ phases (C=CaO, S=$SiO_2$, A=$Al_2O_3$, F=$Fe_2O_3$). The gypsum used contains calcium oxide (CaO), sulphate ($SO_3$) and water.

In the Portland slag cement produced by existing processes, granulated blast furnace slag does not actively participate in the hydration reaction during early stage due to poor reactivity. As a result, the early strength development is low.

Also only a limited quantity of granulated blast furnace slag is used in Portland cement due to its poor reactivity. In the process of the present invention, the cement clinker is ball-milled separately in the dry condition. The granulated blast furnace slag is milled in an attrition mill. Smaller size (2 mm to <0.5 mm) of grinding media and high agitator speed results in high efficiency of attrition mill. While smaller size of media provides larger contact surface between the media and granulated blast furnace slag, higher agitator speed gives rise to greater kinetic energy of the media. The attrition milling process mechanically activates the granulated blast furnace slag and its reactivity is increased. The increased reactivity leads to enhanced hydraulic activity of slag. As soon as water is added, slag particles undergo hydration along with cement clinker and gypsum. Due to combined hydration reactions, a complex C—S—H gel (C=CaO, S=$SiO_2$, H=$H_2O$) with very dense microstructure is formed, which results in development of early strength. Also due to increased reactivity, higher percentage of granulated blast furnace slag is used in the Portland slag cement.

SUMMARY OF THE INVENTION

Accordingly, the present invention provides an improved process for the production of Portland slag cement using granulated blast furnace slag, which comprises:
(i) forming of cement clinker by known process,
(ii) ball-milling of cement clinker for a period ranging between 30-60 minutes in dry condition,
(iii) reducing size of granulated blast furnace slag by any process to obtain the size in the range between 210 to 100 μm for using as feed for attrition mill,
(iv) wet milling of granulated blast furnace slag for a period ranging between 5-15 minutes in an attrition mill using granulated blast furnace slag to water ratio in the range of 1:1 to 1:2 and granulated blast furnace slag to grinding ball ratio in the range of 1:5 to 1:15,
(v) removing water from the slurry obtained after attrition milling by known process,
(vi) drying of the obtained slurry by known process,
(vii) mixing intimately of:
   attrition milled slag obtain in step (vi) in the range of: 50 to 95% by weight
   ball-milled clinker obtain in step (ii) in the range of: 05 to 45% by weight
   gypsum in the range of: 01 to 05% by weight for a period in the range of 15 to 30 minutes.

DETAILED DESCRIPTION

According to the feature of the invention, the granulated blast furnace slag, cement clinker and gypsum may be selected from the following composition range:

| Constituent (wt. %) | Granulated blast furnace slag | Cement clinker | Gypsum |
|---|---|---|---|
| $SiO_2$ | 20-40 | 20-25 | — |
| $Al_2O_3$ | 20-40 | 3-8 | — |
| $Fe_2O_3$ | 0-2 | 2-4 | — |
| CaO | 20-40 | 60-70 | 25-40 |
| MgO | 5-17 | 0-6 | — |
| MnO | 0-5 | 0-4 | — |
| $SO_3$ | 0-2 | <1.5 | 30-60 |
| Glass content(%) | >85 | — | — |

The Portland slag cement obtained in the present invention may have the following range of properties:

| (a) Compressive strength | |
|---|---|
| 1 day | 1-10 MPa |
| 3 day | 10-20 MPa |
| 7 day | 15-25 MPa |
| 28 day | 30-50 MPa |
| (b) Setting time | |
| Initial setting | 10-60 Minute |
| Final setting | 400-800 Minute |
| (c) Autoclave expansion | <1% |

Novelty of the present invention is that it uses granulated blast furnace slag, which is an industrial waste, in the range of 50-95% by weight. Also the products produced by the process of present invention have better early compressive strength (1 day 1-10 MPa, 3 day 10-20 MPa) that the products produced by conventional processes (1 day 1-5 MPa, 3 day 5-16 MPa)

The following examples are given by way of illustration and should not be construed to limit the scope of invention.

EXAMPLE—1

450 grams of cement clinker was dry milled in a ball mill for 30 minutes. The material to ball ratio was kept 1:10. 500 grams of granulated blast furnace slag was wet milled in an attrition mill for 10 minutes using water as medium. The material to water ratio was kept as 1:1.5 and material to ball ratio was kept 1:10. The water present in attrition milled slurry was separated by filtering and then the material was dried at 40° C. in an electric oven for 6 hours and then cooled to room temperature. 450 grams of ball milled cement clinker, 500 grams of attrition milled dry powder of granulated blast furnace slag and 50 grams of gypsum powder were intimately mixed in a pot mill for 15 minutes and then stored in an airtight container for various tests. Physical testing such as setting time, compressive strength after 1, 3, 7 and 28 day hydration, autoclave expansion was carried out as per Indian standard IS 4031-1998. The properties obtained are furnished in table 1.

TABLE 1

Properties of Portland slag cement discussed above

| Properties | Values |
|---|---|
| Setting time (minute) | |
| Initial | 15 |
| Final | 450 |
| Compressive strength (MPa) | |
| 1 day | 5 |
| 3 day | 14 |
| 7 day | 18 |
| 28 day | 38 |
| Autoclave expansion (%) | 0.3 |

EXAMPLE—2

250 grams of cement clinker was dry milled in a ball mill for 30 minutes. The material to ball ratio was kept 1:10. 700 grams of granulated blast furnace slag was wet milled in an attrition mill for 15 minutes using water as medium. The material to water ratio was kept as 1:1.5 and material to ball ratio was kept 1:10. The water present in attrition milled slurry was separated by filtering and then the material was dried at 40° C. in an electric oven for 6 hours and then cooled to room temperature. 250 grams of ball milled cement clinker, 700 grams of attrition milled dry powder of granulated blast furnace slag and 50 grams of gypsum powder were intimately mixed in a pot mill for 15 minutes and then stored in an airtight container for various tests. Physical testing such as setting time, compressive strength after 1, 3, 7 and 28 day hydration, autoclave expansion was carried out as per Indian standard IS 4031-1998. The properties obtained are furnished in table 2.

TABLE 2

Properties of Portland slag cement discussed above

| Properties | Values |
| --- | --- |
| Setting time (minute) | |
| Initial | 35 |
| Final | 610 |
| Compressive strength (MPa) | |
| 1 day | 7 |
| 3 day | 15 |
| 7 day | 22 |
| 28 day | 43 |
| Autoclave expansion (%) | 0.2 |

Autoclave expansion (%) 0.2

EXAMPLE—3

150 grams of cement clinker was dry milled in a ball mill for 30 minutes. The material to ball ratio was kept 1:10. 800 grams of granulated blast furnace slag was wet milled in an attrition mill for 10 minutes using water as medium. The material to water ratio was kept as 1:1.5 and material to ball ratio was kept 1:10. The water present in attrition milled slurry was separated by filtering and then the material was dried at 40° C. in an electric oven for 6 hours and then cooled to room temperature. 150 grams of ball milled cement clinker, 800 grams of attrition milled dry powder of granulated blast furnace slag and 50 grams of gypsum powder were intimately mixed in a pot mill for 15 minutes and then stored in an airtight container for various tests. Physical testing such as setting time, compressive strength after 1, 3, 7 and 28 day hydration, autoclave expansion was carried out as per Indian standard IS 4031-1998. The properties obtained are furnished in table 3.

TABLE 3

Properties of Portland slag cement discussed above

| Properties | Values |
| --- | --- |
| Setting time (minute) | |
| Initial | 40 |
| Final | 625 |
| Compressive strength (MPa) | |
| 1 day | 10 |
| 3 day | 20 |
| 7 day | 25 |
| 28 day | 49 |
| Autoclave expansion (%) | 0.02 |

EXAMPLE—4

30 grams of cement clinker was dry milled in a ball mill for 30 minutes. The material to ball ratio was kept 1:10. 950 grams of granulated blast furnace slag was wet milled in an attrition mill for 15 minutes using water as medium. The material to water ratio was kept as 1:1.5 and material to ball ratio was kept 1:10. The water present in attrition milled slurry was separated by filtering and then the material was dried at 40° C. in an electric oven for 6 hours and then cooled to room temperature. 30 grams of ball milled cement clinker, 950 grams of attrition milled dry powder of granulated blast furnace slag and 20 grams of gypsum powder were intimately mixed in a pot mill for 15 minutes and then stored in an airtight container for various tests. Physical testing such as setting time, compressive strength after 1, 3, 7 and 28 day hydration, autoclave expansion was carried out as per Indian standard IS 4031-1998. The properties obtained are furnished in table 4.

TABLE 4

Properties of Portland slag cement discussed above

| Properties | Values |
| --- | --- |
| Setting time (minute) | |
| Initial | 55 |
| Final | 750 |
| Compressive strength (MPa) | |
| 1 day | 3 |
| 3 day | 12 |
| 7 day | 15 |
| 28 day | 33 |
| Autoclave expansion (%) | 0.03 |

The main advantages of the present invention are:
1. The process utilises higher proportion of abundantly available industrial waste (granulated blast furnace slag) as major raw material to produce Portland slag cement, thereby the cost of production is considerably reduced in comparison to the known process.
2. The process of the present invention is helpful in resource conservation by replacing cement clinker, which uses costly raw materials e.g. limestone, clay, quartz, quartzite, etc for its production by an industrial wastes.
3. The process replaces high proportion of cement clinker, which is produced by an energy intensive process by an industrial waste (granulated blast furnace slag), thereby considerable reduction in energy consumption in comparison to the known process.
4. The process replaces high proportion of cement clinker, which causes $CO_2$ emission in the environment, by an industrial waste (granulated blast furnace slag), thereby considerable reduction in $CO_2$ emission in comparison to the known process.
5. The products developed by the process of present invention are superior in terms of early strength development then the products produced by the existing process. This is obtained by the mechanical activation of slag, which enhances its reactivity and gives improved early strength.

What is claimed is:
1. An improved process for the production of Portland slag cement using of granulated blast furnace slag, the said process comprising the steps of:
(i) preparing cement clinker

(ii) ball-milling of cement clinker for a period ranging between 30-60 minutes under dry condition,
(iii) reducing size of granulated blast furnace slag to a size of ranging between 210 to 100 μm, for using as feed for attrition mill,
(iv) wet milling of granulated blast furnace slag for a period ranging between 5-15 minutes, in an attrition mill with granulated blast furnace slag to water ratio in the range of 1:1 to 1:2 and granulated blast furnace slag to grinding ball ratio in the range of 1:5 to 1:15 to obtain a slurry,
(v) removing water from the above said slurry after attrition milling followed by drying to obtain the attrition milled slag,
(vi) mixing intimately attrition milled slag obtain in step (v) in the range of: 50 to 95% by weight,
    ball-milled clinker obtain in step (ii) in the range of: 05 to 45% by weight,
    and gypsum in the range of: 01 to 05% by weight,
    for a period in the range of 15 to 30 minutes, to obtain the Portland slag cement.

2. An improved process as claimed in claim 1 wherein the granulated blast furnace slag has a following composition:
    range: $SiO_2$-20 to 40%, $Al_2O_3$-20 to 40%, $Fe_2O_3$-0 to 2%, CaO-20 to 40%, MgO-5 to 17%, MnO-0 to 5%, $SO_3$-0 to 2% and glass content >85%.

3. An improved process as claimed in claim 1, wherein the cement clinker has a following composition range: $SiO_2$-20 to 25%, $Al_2O_3$-3 to 8%, $Fe_2O_3$-2 to 4%, CaO-60 to 70%, MgO-0 to 6%, MnO-0 to 4%, $SO_3$ <1.5%.

4. An improved process as claimed in claim 1, wherein the gypsum has a following composition range: CaO-25 to 40%, $SO_3$-30 to 60%.

* * * * *